(12) United States Patent
Dass

(10) Patent No.: US 9,471,237 B1
(45) Date of Patent: Oct. 18, 2016

(54) MEMORY CONSUMPTION TRACKING

(71) Applicant: Amazon Technologies, Inc., Seattle, WA (US)

(72) Inventor: Ramya Dass, Chennai (IN)

(73) Assignee: Amazon Technologies, Inc., Seattle, WA (US)

(*) Notice: Subject to any disclaimer, the term of this patent is extended or adjusted under 35 U.S.C. 154(b) by 70 days.

(21) Appl. No.: 14/613,934

(22) Filed: Feb. 4, 2015

(51) Int. Cl.
G06F 3/06 (2006.01)

(52) U.S. Cl.
CPC ............ G06F 3/0625 (2013.01); G06F 3/065 (2013.01); G06F 3/067 (2013.01); G06F 3/0653 (2013.01)

(58) Field of Classification Search
CPC .... G06F 3/0625; G06F 3/065; G06F 3/0653; G06F 3/067
USPC ......... 711/162, 154, 170; 707/814; 717/124, 717/127, 151; 718/1, 104
See application file for complete search history.

(56) References Cited

U.S. PATENT DOCUMENTS

| | | | |
|---|---|---|---|
| 5,689,707 A * | 11/1997 | Donnelly | G06F 11/366 |
| 6,898,602 B2 | 5/2005 | Sayag | |
| 6,956,507 B2 * | 10/2005 | Castelli | G06F 12/08 |
| | | | 341/50 |
| 7,089,460 B2 | 8/2006 | Fu | |
| 7,146,479 B2 * | 12/2006 | Li | G06F 9/5016 |
| | | | 707/999.202 |
| 7,552,305 B2 * | 6/2009 | Dryfoos | G06F 11/073 |
| | | | 711/153 |
| 7,685,396 B2 | 3/2010 | Sze et al. | |
| 7,711,921 B2 * | 5/2010 | Schneider | G06F 12/023 |
| | | | 711/112 |
| 7,716,448 B2 * | 5/2010 | Schneider | G06F 12/023 |
| | | | 711/112 |
| 7,904,688 B1 * | 3/2011 | Kuo | G06F 12/023 |
| | | | 711/154 |
| 8,037,477 B2 | 10/2011 | Findeisen et al. | |
| 8,108,632 B2 | 1/2012 | van Riel et al. | |
| 8,166,269 B2 * | 4/2012 | Vengerov | G06F 12/0269 |
| | | | 711/170 |
| 8,255,820 B2 | 8/2012 | Rivlin et al. | |
| 8,527,958 B2 * | 9/2013 | Sohm | G06F 11/323 |
| | | | 717/127 |
| 8,626,993 B2 | 1/2014 | Vaishampayan et al. | |
| 8,701,088 B2 | 4/2014 | Wielaard | |
| 9,152,329 B2 * | 10/2015 | Higashiyama | G06F 11/1441 |
| 2003/0028739 A1 * | 2/2003 | Li | G06F 9/5016 |
| | | | 711/170 |
| 2004/0117578 A1 * | 6/2004 | Castelli | G06F 12/08 |
| | | | 711/170 |
| 2005/0204342 A1 | 9/2005 | Broussard | |
| 2006/0253845 A1 | 11/2006 | Achanta et al. | |

(Continued)

OTHER PUBLICATIONS

Author Unknown, "Case Study—Freescale and Amazon Write a New Chapter in Digital Reading," freescale, Document No. KNDLPWCS Rev. 0, Available at: http://cache.freescale.com/files/industrial/doc/white_paper/KNDLPWCS.pdf, 4 pages, (2014).

(Continued)

*Primary Examiner* — Stephen Elmore
(74) *Attorney, Agent, or Firm* — K&L Gates LLP (57) ABSTRACT

Systems and methods are provided for monitoring memory consumption in computing devices. Memory monitoring can be performed by tracking multiple parameters on both a regular schedule and in response to the detection of certain events. These memory parameters can include the total amount of free memory in the system, the memory usage associated with certain processes, and stack traces of current threads. These memory parameters can be stored locally in a memory log on the device's secondary storage and then transmitted to a remote test system for detailed analysis along with the memory logs from other devices.

20 Claims, 10 Drawing Sheets

(56) References Cited

U.S. PATENT DOCUMENTS

| | | | |
|---|---|---|---|
| 2008/0209153 A1* | 8/2008 | Schneider | G06F 12/023 711/170 |
| 2008/0209154 A1* | 8/2008 | Schneider | G06F 12/023 711/170 |
| 2009/0006778 A1* | 1/2009 | Sidi | H04L 1/1835 711/154 |
| 2009/0172664 A1 | 7/2009 | Mostafa | |
| 2009/0228870 A1 | 9/2009 | Kao et al. | |
| 2010/0153475 A1 | 6/2010 | Zedlitz et al. | |
| 2011/0107050 A1* | 5/2011 | Vengerov | G06F 12/0269 711/170 |
| 2012/0210047 A1* | 8/2012 | Peters | G06F 17/30578 711/103 |
| 2013/0104028 A1 | 4/2013 | Murray et al. | |
| 2014/0215483 A1* | 7/2014 | Akimoto | G06F 9/5016 718/104 |
| 2015/0347023 A1* | 12/2015 | Konovalov | G06F 3/0608 711/154 |
| 2015/0370483 A1* | 12/2015 | Schoebel-Theuer | G06F 11/2074 711/104 |
| 2016/0077966 A1* | 3/2016 | Stabrawa | G06F 3/0604 711/172 |
| 2016/0077975 A1* | 3/2016 | Stabrawa | G06F 3/0604 711/209 |

OTHER PUBLICATIONS

Author Unknown, "i.MX Applications Processors—i.MX508 Processor for eReaders," freescale i.MX, Document No. IMX508FS, Rev. 2, Available at: http://cache.freescale.com/files/32bit/doc/fact_sheet/IMX508FS.pdf, 3 pages, (2011).

Author Unknown, "Memory Consumption in Linux," emilics.com, Available at: http://emilics.com/notebook/page_871.html, 3 pages, (printed Nov. 25, 2014).

Hall, "Thanks for the memory Understanding how the JVM uses native memory on Windows and Linux," developerWorks, Available at: http://www.ibm.com/developerworks/library/j-nativememory-linux/, 30 pages, Apr. 21, 2009).

Prodduturi, "Effective Handling of Low Memory Scenarios in Android," Indian Institute of Technology Bombay, AAKASH—NME-ICT (MHRD), AAKASH project, IIT Bombay, Available at http://foss.coep.org.in/aakash/day4/6-Low%20Memory%20Scenarios.pdf, 25 pages, (2013).

* cited by examiner

Dashboard >> overview & stats

Reference Build: J6 B034     Current Build: 037     Device Config: DTCP, All, en-US locale Legend: Light Green: equal/better than baseline, Yellow: worse than baseline but within tolerance, Pink: worse than baseline and tolerance CVM Heap Total Free

| | | Test Suite | J6 B034 | | | 035 | 036 | | 036 | 037 | | JIRA(s) |
|---|---|---|---|---|---|---|---|---|---|---|---|---|
| | | | Min (KB) | Max (KB) | Avg (KB) | Min (KB) | Max (KB) | Avg (KB) | Min (KB) | Max (KB) | Avg (KB) | |
| + | | SteadyState | 11735.58 | 15978.89 | 12956 | 11818.88 | 15417.6 | 12846 | 11710.4 | 15434.86 | 12969.73 | ✎ |
| + | | MAT | 2564.52 | 10707.18 | 6569.78 | 2847.27 | 12142.76 | 6787.1 | 1067.11 | 9738.98 | 5451.17 | ✎ |
| + | | KDS_JUNO_P0_BAT_HomeSettings | 0 | 0 | 0 | 0 | 0 | 0 | 0 | 0 | 0 | ✎ |
| + | | KDS_JUNO_P0_BAT_Reader | 0 | 0 | 0 | 0 | 0 | 0 | 0 | 0 | 0 | ✎ |
| + | | KDS_JUNO_P0_BAT_Reader_1 | 0 | 0 | 0 | 0 | 0 | 0 | 0 | 0 | 0 | ✎ |
| + | | MAT_JP | 0 | 0 | 0 | 0 | 0 | 0 | 0 | 0 | 0 | |
| + | | MemoryProfilingTests | 0 | 0 | 0 | 0 | 0 | 0 | 0 | 0 | 0 | |

FIG. 4A

System Free memory

| | | J6 B034 | | | 035 | 036 | 037 | 036 | 037 | JIRA(s) |
|---|---|---|---|---|---|---|---|---|---|---|
| | Test Suite | Min (KB) | Max (KB) | Avg (KB) | Min (KB) | Max (KB) | Avg (KB) | Min (KB) | Max (KB) | Avg (KB) | |
| + | SteadyState | 70276 | 95012 | 90399 | 82428 | 90072 | 88687 | 82048 | 90480 | 88763 | 🖉 |
| + | MAT | 21980 | 68780 | 42600 | 23196 | 57152 | 37752 | 21700 | 55636 | 36655 | JSIXONE-2130 |
| + | KDS_JUNO_P0_BAT_HomeSettings | 0 | 0 | 0 | 0 | 0 | 0 | 0 | 0 | 0 | 🖉 |
| + | KDS_JUNO_P0_BAT_Reader | 0 | 0 | 0 | 0 | 0 | 0 | 0 | 0 | 0 | 🖉 |
| + | KDS_JUNO_P0_BAT_Reader_1 | 0 | 0 | 0 | 0 | 0 | 0 | 0 | 0 | 0 | 🖉 |
| + | MAT_JP | 0 | 0 | 0 | 0 | 0 | 0 | 0 | 0 | 0 | 🖉 |
| + | MemoryProfilingTests | 0 | 0 | 0 | 0 | 0 | 0 | 0 | 0 | 0 | 🖉 |

System Anon Pages

| | | J6 B034 | | | 035 | 036 | 037 | 036 | 037 | JIRA(s) |
|---|---|---|---|---|---|---|---|---|---|---|
| | Test Suite | Min (KB) | Max (KB) | Avg (KB) | Min (KB) | Max (KB) | Avg (KB) | Min (KB) | Max (KB) | Avg (KB) | |
| + | SteadyState | 81496 | 87168 | 83197 | 83868 | 85892 | 85018 | 84212 | 857674 | 84922 | 🖉 |
| + | MAT | 95844 | 173280 | 149947 | 112768 | 178008 | 147344 | 112184 | 177920 | 150086 | 🖉 |
| + | KDS_JUNO_P0_BAT_HomeSettings | 0 | 0 | 0 | 0 | 0 | 0 | 0 | 0 | 0 | 🖉 |
| + | KDS_JUNO_P0_BAT_Reader | 0 | 0 | 0 | 0 | 0 | 0 | 0 | 0 | 0 | 🖉 |
| + | KDS_JUNO_P0_BAT_Reader_1 | 0 | 0 | 0 | 0 | 0 | 0 | 0 | 0 | 0 | 🖉 |
| + | MAT_JP | 0 | 0 | 0 | 0 | 0 | 0 | 0 | 0 | 0 | 🖉 |
| + | MemoryProfilingTests | 0 | 0 | 0 | 0 | 0 | 0 | 0 | 0 | 0 | 🖉 |

420

FIG. 4B cvm Memory (uss/pss/rss/anon in KB)

| USS | PSS | RSS | Anon |
|---|---|---|---|

432 →

| Test Suite | J6 B034 | | | 035 036 037 | | | 036 037 | | | 036 037 | | | JIRA(s) |
|---|---|---|---|---|---|---|---|---|---|---|---|---|---|
| | Min (KB) | Max (KB) | Avg (KB) | Min (KB) | Max (KB) | Avg (KB) | Min (KB) | Max (KB) | Avg (KB) | Min (KB) | Max (KB) | Avg (KB) | |
| SteadyState | 48216 | 50336 | 49254 | 48732 | 49896 | 49482 | 48928 | 50244 | 49438 | | | | |
| + MAT | 57620 | 80420 | 74924 | 54260 | 82380 | 74174 | 59236 | 87252 | 78564 | | | | ✎ |
| + KDS_JUNO_P0_BAT_HomeSettings | 0 | 0 | 0 | 0 | 0 | 0 | 0 | 0 | 0 | | | | ✎ |
| + KDS_JUNO_P0_BAT_Reader | 0 | 0 | 0 | 0 | 0 | 0 | 0 | 0 | 0 | | | | ✎ |
| + KDS_JUNO_P0_BAT_Reader_1 | 0 | 0 | 0 | 0 | 0 | 0 | 0 | 0 | 0 | | | | ✎ |
| + MAT_JP | 0 | 0 | 0 | 0 | 0 | 0 | 0 | 0 | 0 | | | | ✎ |
| + MemoryProfilingTests | 0 | 0 | 0 | 0 | 0 | 0 | 0 | 0 | 0 | | | | ✎ |

Stored Memory (uss/pss/rss/anon in KB)

| USS | PSS | RSS | Anon |
|---|---|---|---|

| | Test Suite | J6 B034 | | | 035 | 036 | 037 | 036 | 037 | JIRA(s) |
|---|---|---|---|---|---|---|---|---|---|---|
| | | Min (KB) | Max (KB) | Avg (KB) | Min (KB) | Max (KB) | Avg (KB) | Min (KB) | Max (KB) | Avg (KB) | |
| + | SteadyState | 4136 | 5096 | 4273 | 4176 | 4184 | 4177 | 4172 | 4176 | 4175 | ✎ |
| + | MAT | 3240 | 49484 | 21818 | 3328 | 30256 | 14974 | 3244 | 28448 | 12236 | ✎ |
| + | KDS_JUNO_P0_BAT_HomeSettings | 0 | 0 | 0 | 0 | 0 | 0 | 0 | 0 | 0 | ✎ |
| + | KDS_JUNO_P0_BAT_Reader | 0 | 0 | 0 | 0 | 0 | 0 | 0 | 0 | 0 | ✎ |
| + | KDS_JUNO_P0_BAT_Reader_1 | 0 | 0 | 0 | 0 | 0 | 0 | 0 | 0 | 0 | ✎ |
| + | MAT_JP | 0 | 0 | 0 | 0 | 0 | 0 | 0 | 0 | 0 | ✎ |
| + | MemoryProfilingTests | 0 | 0 | 0 | 0 | 0 | 0 | 0 | 0 | 0 | ✎ |

Proc A Memory (uss/pss/rss/anon in KB)

| USS | PSS | RSS | Anon |
|---|---|---|---|

| | Test Suite | J6 B034 | | | 035 Min (KB) | 036 Max (KB) | 037 Avg (KB) | 036 Min (KB) | 037 Max (KB) | Avg (KB) | JIRA(s) |
|---|---|---|---|---|---|---|---|---|---|---|---|
| | | Min (KB) | Max (KB) | Avg (KB) | | | | | | | |
| + | SteadyState | 2572 | 2864 | 2820 | 2192 | 2908 | 2806 | 2192 | 2908 | 2806 | 🖉 |
| + | MAT | 1984 | 3192 | 2357 | 2008 | 3324 | 2407 | 2008 | 3272 | 2411 | 🖉 |
| + | KDS_JUNO_P0_BAT_HomeSettings | 0 | 0 | 0 | 0 | 0 | 0 | 0 | 0 | 0 | 🖉 |
| + | KDS_JUNO_P0_BAT_Reader | 0 | 0 | 0 | 0 | 0 | 0 | 0 | 0 | 0 | 🖉 |
| + | KDS_JUNO_P0_BAT_Reader_1 | 0 | 0 | 0 | 0 | 0 | 0 | 0 | 0 | 0 | 🖉 |
| + | MAT_JP | 0 | 0 | 0 | 0 | 0 | 0 | 0 | 0 | 0 | |
| + | MemoryProfilingTests | 0 | 0 | 0 | 0 | 0 | 0 | 0 | 0 | 0 | |

Proc B Memory (uss/pss/rss/anon in KB)

| USS | PSS | RSS | Anon |
|---|---|---|---|

| | Test Suite | J6 B034 | | | 035 Min (KB) | 036 Max (KB) | 037 Avg (KB) | 036 Min (KB) | 037 Max (KB) | Avg (KB) | JIRA(s) |
|---|---|---|---|---|---|---|---|---|---|---|---|
| | | Min (KB) | Max (KB) | Avg (KB) | | | | | | | |
| + | SteadyState | 3724 | 4144 | 4084 | 4220 | 4224 | 4223 | 4224 | 4224 | 4224 | 🖉 |
| + | MAT | 3724 | 30404 | 6024 | 3796 | 30992 | 5874 | 3792 | 31080 | 6020 | 🖉 |
| + | KDS_JUNO_P0_BAT_HomeSettings | 0 | 0 | 0 | 0 | 0 | 0 | 0 | 0 | 0 | 🖉 |
| + | KDS_JUNO_P0_BAT_Reader | 0 | 0 | 0 | 0 | 0 | 0 | 0 | 0 | 0 | 🖉 |
| + | KDS_JUNO_P0_BAT_Reader_1 | 0 | 0 | 0 | 0 | 0 | 0 | 0 | 0 | 0 | 🖉 |
| + | MAT_JP | 0 | 0 | 0 | 0 | 0 | 0 | 0 | 0 | 0 | |
| + | MemoryProfilingTests | 0 | 0 | 0 | 0 | 0 | 0 | 0 | 0 | 0 | |

Process Memory | USS | PSS | RSS | Anon |

| | J6 B034 | | | 035 | 036 | 037 | 035 | 036 | 037 | JIRA(s) |
|---|---|---|---|---|---|---|---|---|---|---|
| Process | Min (KB) | Max (KB) | Avg (KB) | Min (KB) | Max (KB) | Avg (KB) | Min (KB) | Max (KB) | Avg (KB) | |
| CVM | 48216 | 91404 | 77081 | 48732 | 94304 | 78902 | 46008 | 91724 | 69859 | |
| Proc A | 8984 | 19916 | 13111 | 10188 | 21916 | 14698 | 9968 | 24144 | 14637 | ✎ |
| Proc B | 3088 | 49800 | 16336 | 3244 | 30256 | 14508 | 3112 | 31512 | 12791 | ✎ |
| Proc C | 3724 | 38436 | 7884 | 3344 | 30992 | 6816 | 3792 | 32180 | 6920 | ✎ |
| Proc D | 3676 | 9588 | 6975 | 3792 | 9092 | 6785 | 3516 | 10072 | 6290 | ✎ |
| Proc E | 2832 | 4076 | 3459 | 2888 | 3848 | 3373 | 2892 | 3880 | 3493 | ✎ |
| Proc F | 1728 | 5616 | 3202 | 2056 | 5284 | 3896 | 1988 | 5512 | 3210 | ✎ |
| Proc G | 1376 | 3192 | 2028 | 1396 | 3324 | 2103 | 1380 | 5164 | 2549 | ✎ |
| Proc H | 1672 | 5640 | 2387 | 1716 | 6396 | 2557 | 1680 | 6732 | 2466 | ✎ |
| Proc I | 712 | 3088 | 1091 | 808 | 3548 | 1211 | 764 | 3276 | 1082 | ✎ |
| Proc J | 680 | 4264 | 1119 | 628 | 2460 | 959 | 604 | 5224 | 944 | ✎ |
| Proc K | 620 | 1136 | 818 | 628 | 1092 | 856 | 620 | 1184 | 855 | ✎ |
| Proc L | 628 | 1104 | 738 | 668 | 1028 | 712 | 640 | 1352 | 739 | ✎ |
| Proc M | 536 | 1260 | 711 | 596 | 1096 | 651 | 540 | 1108 | 667 | ✎ |
| Proc N | 564 | 692 | 640 | 564 | 740 | 632 | 568 | 704 | 639 | ✎ |
| Proc O | 584 | 904 | 614 | 576 | 972 | 618 | 576 | 1136 | 623 | ✎ |
| Proc P | 520 | 704 | 583 | 560 | 1040 | 605 | 536 | 1000 | 581 | ✎ |
| Proc Q | 384 | 588 | 498 | 516 | 556 | 526 | 384 | 664 | 511 | ✎ |
| Proc R | 472 | 920 | 486 | 472 | 956 | 493 | 472 | 960 | 493 | ✎ |
| Proc S | 416 | 500 | 432 | 416 | 452 | 429 | 416 | 488 | 436 | ✎ |
| Proc T | 540 | 596 | 544 | 424 | 456 | 427 | 424 | 456 | 428 | ✎ |

List of Events

| | Events | Processes | J6 B034 | 035 | 036 | 037 | 036 | 037 | JIRA(s) |
|---|---|---|---|---|---|---|---|---|---|
| + | all | systemMemoryVeryLow | 0 | | | 3 | | 9 | ✎ |
| + | Pdfreader | Process too Large | 0 | | | 4 | | 3 | ✎ |
| + | Cvm | Pmond kill | 0 | | | 0 | | 2 | ✎ |
| + | Webreader | Process too Large | 112 | | | 152 | | 457 | ✎ |
| + | cvmTotalFree | OOM | 0 | | | 33 | | 0 | ✎ |
| + | All | Ushrink | 200 | | | 414 | | 1250 | ✎ |
| + | Cvm | Process too Large | 222 | | | 811 | | 867 | ✎ |
| + | All | SystemMemoryCritical | 1 | | | 8 | | 21 | ✎ |
| + | cvmTotalFree | GC | 807 | | | 1792 | | 2605 | ✎ |
| + | All | SystemMemoryNormal | 1 | | | 8 | | 21 | ✎ |
| + | cvmTotalFree | HeapMarginal | 31 | | | 93 | | 106 | ✎ |
| + | Framework | Abnormal Stop | 0 | | | 1 | | 6 | ✎ |
| + | cvmTotalFree | Heaplow | 6 | | | 106 | | 54 | ✎ |
| + | All | systemMemoryLow | 1 | | | 32 | | 56 | ✎ |

MEMORY CONSUMPTION TRACKING

BACKGROUND

In computer systems, memory is a limited hardware resource that must be shared by multiple processes. Modern computer systems utilize memory management to dynamically allocate portions of main memory to one or more processes or objects for execution by the processor. Many applications utilize a large amount of memory, which can result in low memory or out of memory (OOM) conditions where no additional memory can be allocated for use by other programs or the operating system.

Accordingly, there is a need for improved systems and methods for monitoring memory consumption in virtualized environments.

BRIEF DESCRIPTION OF DRAWINGS

FIGS. 4A-4G are screen shots of an exemplary memory analysis application, in accordance with embodiments of the present invention.

DETAILED DESCRIPTION

In the following description, reference is made to the accompanying drawings which illustrate several embodiments of the present disclosure. It is to be understood that other embodiments may be utilized and system or process changes may be made without departing from the spirit and scope of the present disclosure. The following detailed description is not to be taken in a limiting sense, and the scope of the embodiments of the present invention is defined only by the claims of the issued patent. It is to be understood that drawings are not necessarily drawn to scale.

Virtual memory systems separate the memory addresses used by a process from actual physical addresses by assigning the process to a virtual address space, thereby increasing the effectively available amount of main memory by swapping to secondary storage. Unfortunately, many applications utilize a large amount of memory, which can result in low memory or out of memory (00M) conditions where no additional memory can be allocated for use by other programs or the operating system. As described above, many advanced computer systems utilize garbage collection processes to reclaim memory.

Some computing devices, such as e-reader devices, are intended for a narrow range of functions, e.g., displaying e-books or other static digital media content (often primarily text-based with limited or no graphics), shopping for digital content, and managing device settings. Accordingly, these e-reader devices are often designed with much more limited hardware resources than other mobile computing devices such as tablet computers or smartphones, which are designed to run a large variety of processor and memory intensive applications. For example, some e-reader devices may have, for example, 2 GB, 1056 MB, 512 MB, 256 MB, 128 MB, or less in main memory. Similarly, computing devices with small form factors may also have limited hardware resources due to space and cost constraints. Memory management can be particularly important for these types of devices having limited hardware resources, including limited main memory capacity of, e.g., less than 2 GB or less than 1056 MB, and a single core low power processor, since even small file I/O operations can cause a significant impact on performance.

One key aspect of testing new software releases for e-readers or other computing devices is the tracking of memory consumption. The testing is important to ensure that each new software release will not cause excessive low memory conditions when the device is operated by end users. However, in many computer systems, particularly those that utilize application virtual machines which simultaneously run multiple threads corresponding to different processes, it can be difficult to precisely monitor memory consumption and to identify which processes resulted in undesirably low memory conditions.

In accordance with aspects of the present invention, systems and methods are provided for monitoring memory consumption in computing devices. These systems and methods are particularly advantageous for computing devices executing monolithic processes which perform multiple functions for the device, such as e-reader devices whose functionality is implemented using an application virtual machine. The consumption of memory by these monolithic processes can be difficult to track over various use case scenarios, as these types of systems typically do not include tools for monitoring memory consumption by each individual function or operation. Instead, the memory monitoring can be performed by tracking multiple parameters on both a regular schedule and in response to the detection of certain events. These memory parameters can include System Free, Process Memory, and Stack Trace, as will be described in greater detail below. These systems and methods may be implemented for the monitoring of production devices operated by the e-reader end users, or may be implemented for the pre-release testing of pre-production devices or pre-production software releases. In production devices, these memory parameters can be stored locally in a memory log on the device's secondary storage and then transmitted to a remote test system for detailed analysis and comparison with the memory logs from other devices. This analysis can be used to evaluate memory performance in the field for these production devices, and also to define Memory Acceptance Tests ("MAT") for exercising a variety of use cases on future pre-production devices or pre-production software releases. These MATs can be used to quantify overall device memory health before releasing the devices or software for commercial sales. The framework used for exercising MAT, can also be extended for any device pre-production test cases (such as, for example, application test cases, stress test cases) for measuring memory health.

Figure 1:
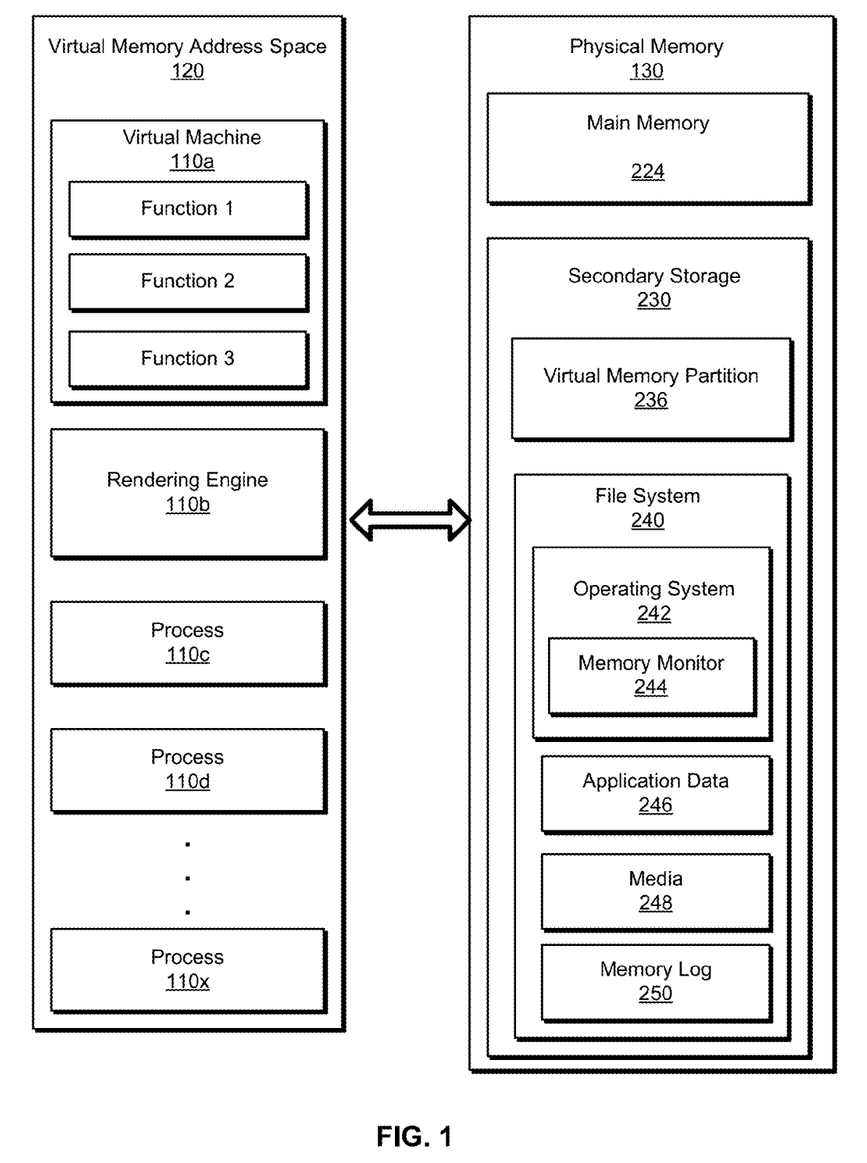
FIG. 1 is an example block diagram illustrating virtual memory and physical memory organization in accordance with embodiments of the present invention.
Figure 2:
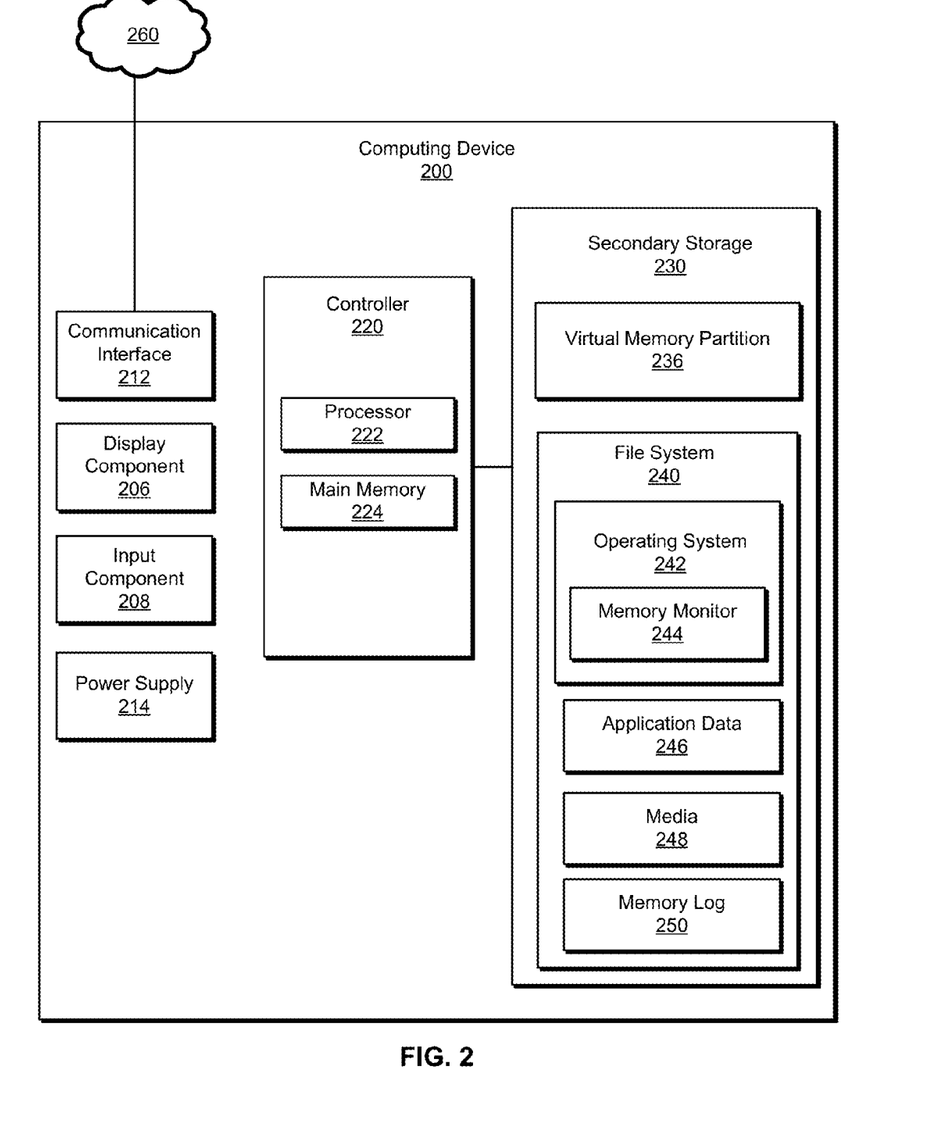
FIG. 2 is an example block diagram of an e-reader computing device implementing the virtual and physical memory organization illustrated in FIG. 1, in accordance with embodiments of the present invention.

FIG. 1 is an example block diagram illustrating virtual memory and physical memory organization in accordance with embodiments of the present invention. FIG. 2 is an example block diagram of an e-reader computing device 200 implementing the virtual and physical memory organization illustrated in FIG. 1.

The computing device 200 includes a display component 206, which may comprise, for example, an electrophoretic display (EPD), electrowetting display and/or any other type of bi-stable display. In other embodiments, the display component 206 may comprise cathode ray tubes (CRTs), liquid crystal display (LCD) screens, gas plasma-based flat panel displays, LCD projectors, or other types of display devices, etc. The computing device 200 may include one or more input components 208 operable to receive inputs from a user. The input component 208 can include, for example, a push button, touch pad, touch screen, wheel, joystick, keyboard, mouse, trackball, keypad, accelerometer, light gun, game controller, or any other such device or element whereby a user can provide inputs to the computing device 200. These input component 208 may be incorporated into the computing device 200 or operably coupled to the computing device 200 via wired or wireless interface. For computing devices with touch sensitive displays, the input component 208 can include a touch sensor that operates in conjunction with the display component 206 to permit users to interact with the image displayed by the display component 206 using touch inputs (e.g., with a finger or stylus).

The computing device 200 may also include at least one communication interface 212 comprising one or more wireless components operable to communicate with one or more separate devices within a communication range of the particular wireless protocol. The wireless protocol can be any appropriate protocol used to enable devices to communicate wirelessly, such as Bluetooth, cellular, IEEE 802.11, or infrared communications protocols, such as an IrDA-compliant protocol. It should be understood that the computing device 200 may also include one or more wired communications interfaces for coupling and communicating with other devices, such as a USB port. The communication interface 212 may be used to communicate over a wide area network 260, such as the Internet. The computing device 200 may also include a power supply 214, such as, for example, a rechargeable battery operable to be recharged through conventional plug-in approaches, or through other approaches such as capacitive charging.

The computing device 200 may also include a controller 220 comprising a processor 222 for executing instructions and a main memory 224. The main memory 224 may be implemented in random access memory ("RAM"), static RAM ("SRAM"), dynamic RAM ("DRAM"), synchronous DRAM ("SDRAM"), or any type of volatile or non-volatile memory.

The controller 220 may be operatively coupled to a secondary storage 230 and other components of the device 200 over a system bus. As would be apparent to one of ordinary skill in the art, the secondary storage 230 can include one or more different types of memory, data storage or computer-readable storage media, such as, for example, a hard disk drive or flash memory storage device. The secondary storage 230 may include a virtual memory (VM) partition 236 and a file system 240. The file system 240 may be used to store software for execution by the processor 222, such as, e.g., operating system software 242, a virtual memory monitor 244, and other applications 246, and data, such as, e.g., digital media content 248 and a memory log 250, which will be described in greater detail below.

In an exemplary embodiment, an e-reader computing device 200 may include 256 MB of RAM for its main memory 224 and 4 GB of flash memory for its secondary storage 230.

Referring to FIG. 1, in computer systems implementing virtual memory, such as computing device 200, each instance of a program runs as a process 110a-110x, and the memory addresses used by each process are assigned to a virtual address space within a virtual memory address space 120. The virtual memory addresses are mapped to physical addresses in the physical memory 130 by a memory management unit. The physical memory 130 comprises the high speed main memory 224 and the secondary storage 230.

The virtual memory address space 120 includes virtual address spaces allocated to an application virtual machine (e.g., C virtual machine (CVM) 210a), a WebKit-based rendering engine software component 210b, and a plurality of other processes 210c-210x used for the operation of the device 200. An application virtual machine, sometimes referred to as a process virtual machine, provides a platform-independent program runtime execution environment. CVM 210a is a type of Java virtual machine designed for embedded devices or other computing devices with limited hardware resources. In the illustrated embodiment, the device 200 is an e-reader device and CVM 210a is a monolithic process used to render many of the device's applications, including the e-book reader application, the initial start-up for the device 200, the Home page for the device 200, managing settings for the device 200, the e-ink rendering application, and the device's middleware component for connecting the low level kernel functionalities with e-book services such as registration, network connectivity, download manager, and other utilities. The rendering engine software component 110b is also a monolithic process that renders multiple transient applications used by the e-reader device 200.

When each process 210a-210x is first launched, a virtual address in the virtual memory address space 120 is assigned to that process. The currently executing processes are moved to the main memory 224 for execution by the processor 222. The other processes not currently being executed may be moved to the VM partition 236 until they are needed for execution.

In accordance with embodiments of the present invention, a memory monitor 244 may be used to record a memory log 250 to measure memory usage and availability. The memory monitor 244 may be implemented as part of the operating system kernel or may be implemented as a separate application, and may be used in production devices for monitoring memory usage in end user devices or may be used with pre-production devices for monitoring memory usage in testing prior to commercial release. The memory monitor 244 may be programmed to perform a memory log operation to store a current System Free Memory value and a current Process Memory Consumption value in the memory log 250.

The current System Free Memory value can be calculated in a variety of ways, depending on the architecture of device. In a Linux-based system, a variety of tools, such as, for example, a virtual memory statistics ("vmstat") computer system monitoring tool, a memory reporting tool ("smem") which reports physical memory usage, taking shared memory pages into account, and instrumented CVM code to emit Java heap and garbage collection ("GC") information, can be used to collect and display summary information about operating system memory, processes, interrupts, paging and block I/O. Active memory is the amount of memory being used by a particular process. The vmstat tool may be used to collect the amount of free memory (e.g., the amount of idle memory available in the virtual memory address space 120) and the amount of inactive memory (e.g., the amount of memory allocated to processes that are no longer running) available in the virtual memory address space 120. System memory is consumed by all of the memory used by running processes, the memory consumed by the operating system kernel, and various caches generated at both the kernel and application layers. The current System Free Memory value may be calculated by summing the amount of free memory and inactive memory.

The System Free Memory value alone may be of limited usefulness in monitoring memory consumption by particular processes. When monitoring memory consumption, it is desirable to monitor individual processes that contribute to the system memory and also those processes' memory consumption. The smem tool may be used to capture process level memory information. The instrumented CVM code may be used to emit heap consumption. Some transient processes when executed consume virtual memory, and when terminated, release the virtual memory. However, the released memory may not automatically move to inactive memory. Some operating systems may include a kernel swap daemon ("kswapd"), which periodically executes to move active files into inactive files when system free memory runs low. In some cases, until the kernel swap daemon executes again, the memory released by the transient process may continue to be identified by the vmstat memory monitoring tool as active memory and therefore would not be included in the current free memory value, even though the process has terminated and released its memory for use by other processes.

As described above, the System Free Memory value identifies the total free memory available to the system as a whole. The Process Memory Consumption value comprises one or more memory consumption parameters and can be used to determine the memory consumption of individual processes by analyzing changes in those parameters over a period of time as a variety of processes are executed. For production devices operated by end users in the field, the memory consumption parameters may be recorded on a periodic schedule or in response to certain events, as will be described in greater detail below. In a test environment, the memory consumption parameters may be recorded after the completion of a predetermined series of test use cases, and at various intermediate points during the execution of those test use cases. The memory consumption parameters for individual processes may include one or more of the following: resident set size ("RSS"), proportional set size ("PSS"), unique set size ("USS"), and anonymous page size.

The RSS is the portion of a running process's memory that is stored in main memory 224. The rest of the memory for that process is stored in virtual memory partition 236 or remains in the file system 240 if it was never loaded or was previously unloaded. However, RSS alone may not provide an accurate measurement of the amount of memory consumed by a particular process because RSS includes in its calculation the memory shared between that process and one or more additional processes. Therefore, if the RSS values for several concurrently running processes which share a portion of memory is summed, the shared portion of memory will be counted multiple times, since it will be included in the RSS value associated with each of those processes. Many processes use shared libraries, so taking a sum of each of those RSS values would provide an inflated indication of total memory consumption. However, the RSS value may still be helpful because observed increases in the RSS values can be used to identify newly added processes which share memory with other existing processes. In addition, observed decreases in the RSS values can be used to indicate the removal of a process/shared library or overall memory stress of the system as a result of the swapping out of file backed pages.

The PSS of a process is the count of pages the process has in main memory 224, where each page is divided by the number of processes sharing it, with each page representing a single block of memory used in memory management. Accordingly, the PSS can provide a fairly accurate calculation of the total memory consumed because the sum of PSS values for all of the processes provides a good representation of the total overall memory usage of user space process consumption in a system. When one of those processes utilizing the shared library is terminated, then the amount of PSS memory consumed by that shared library is then distributed across the remaining processes still using that library. When this occurs, the PSS value associated with that terminated process will not provide an accurate representation of the total amount of memory returned to the system after termination, since a portion of that PSS value will be reallocated to the remaining processes and not returned as system free memory. Therefore, the PSS alone may not provide a complete picture of the memory usage, but can be used as another dimension to drill down memory regressions identified by RSS and to rule out memory spikes related to additional process additions which share code pages. One disadvantage of monitoring PSS in a production device is that this monitoring may consume too many processing resources and therefore decrease performance of the device, decrease battery life, and degrade the user experience.

The USS is the set of pages in main memory 224 that are unique to a process and do not include any portion of memory shared with other processes. This is the amount of memory that would be freed if the process was immediately terminated. The USS is another dimension to drill down memory regressions identified by RSS to quantify memory solely used by that process, since the USS reflects the true incremental cost of running a particular process. When that process is terminated, the USS value associated with that process is the total memory which will actually be returned to the system as free memory. However, because the shared memory is excluded from the USS calculation, the USS value alone is not helpful in calculating the total memory consumed by a particular process and should be analyzed in conjunction with one or more additional memory consumption parameters in order to obtain a complete understanding of the memory consumption that would occur in a device. Another disadvantage of monitoring USS in production devices is that this monitoring, like PSS monitoring, can impact device performance and degrade the user experience. However, monitoring of both USS and PSS in a test environment can be accomplished because device responsiveness is not critical during these memory tests.

Anonymous pages are virtual memory mappings with no associated physical address. The anonymous page size can be used to account for memory consumption which will not be released until the process is terminated. Anonymous page consumption is primarily controlled by the individual processes, and the anonymous pages will generally only be released if the process actively releases those pages or if the process is terminated. Any dramatic increase in the anonymous page consumption may be indicative of a software bug resulting in an overconsumption of memory. Monitoring the anonymous page size can be helpful to identify transient spikes in the measurement of System Free Memory that result when a process is launched and later terminated and releases its anonymous pages.

For example, when a pre-production software release is tested by running the system through a predetermined set of use cases, a memory measurement utility is run to determine the total free memory and total inactive memory. The free memory and inactive memory are added to obtain the total System Free Memory after completion of those use cases. If a second build of that same pre-production software is then tested through the same predetermined set of use cases, the total System Free Memory calculated after completion of those use cases may differ, even though the system was performing the same tasks. This can occur due to the variable nature of memory management. Changes in the System Free Memory between tests can occur when a transient process is launched in user space and then terminated at different times during the tests. For example, in operating systems utilizing the kernel swap daemon to move active files into inactive files when system free memory runs low, depending on the timing of when the kernel swap daemon executes, the System Free Memory may produce different values, even when running through the same use case tests. The System Free Memory may vary, depending on whether the kernel swap daemon moved active files into inactive files prior to recording of the memory consumption or after the recording. An analysis of the anonymous pages during each of these tests can provide a picture of the continuous memory usage, without including these transient processes. If the anonymous page consumption for both tests is in the same range, then the software developer may conclude that the difference in System Free Memory was the result of a transient process, such as one that was terminated by the kernel swap daemon. This transient memory consumption spike may be acceptable and not considered to be an indication of a larger problem with the software being tested. This can provide a more comprehensive picture of the memory consumption that occurs over time as various functions are performed, with numerous processes being launched and terminated.

The memory monitor 244 may perform a memory log operation to store the System Free Memory value and Process Memory Consumption value under a variety of conditions. In some embodiments, the memory log operation is performed on a regular schedule, such as, e.g., every minute, ten minutes, fifteen minutes, half hour, hour, or any other desired periodic schedule or interval. In some embodiments, the memory log operation can be performed upon the detection of certain events, such as, for example, a low memory event in which a low memory condition is detected in the main memory 224 of the device. A low memory condition may occur when the amount of free memory in the device's main memory falls below a system-defined amount. Information regarding the event which triggered the memory log operation may also be stored in the memory log.

Any of a variety of events may be used to initiate a memory log operation to store one or more memory parameter values of interest (e.g., System Free, Process Memory, and Stack Trace). Associating various types of events with the corresponding system memory status can provide insight into how the applications are consuming memory and to inform the developer when processes such as clearing an application cache or terminating a process may be desirable.

For example, any time a low memory condition is detected in the device, one or more of the memory parameter values, such as, e.g., the total system level memory, may be recorded in the memory log. Alternatively, multiple levels of low memory conditions may each serve as events triggering memory log operations. For example, three thresholds of low memory events may be defined as a low memory status, an extremely low level status, and a system critical low memory status. Similarly, a memory log operation may be performed every time a low memory condition in the Java heap is detected.

The events used to initiate a memory log operation may also include kernel level events or process level events. For example, the memory log operation may be performed each time a certain kernel level or JVM low heap levels occur, or an out-of-memory process termination process is performed.

Various process level events may also trigger memory log operations. For example, a memory log operation may be performed every time any application or a specified application is launched and terminated. A memory log operation may also be performed each time a process memory monitoring daemon detects that a particular process is experiencing a low memory condition or an excessive memory consumption threshold.

In accordance with embodiments of the present invention, stack traces at the native application level can be recorded on regular intervals or upon detection of certain memory events. A stack trace (sometimes referred to as a backtrace) is a list of the function calls that are currently active in a thread. These stack traces can be associated with the virtual machine thread stack to provide an overall picture of the memory consumption. For example, any time the controller 220 performs a memory allocation, a stack trace may be stored in the memory log. This stack trace may be used to later identify the application call that was responsible for that memory allocation. This can be accomplished by executing a backtrace at the kernel level to provide a native stack trace.

For a monolithic process such as CVM, which provides a Java execution environment for multiple Java processes, the stack traces cannot be uniquely associated with a single Java thread. One method by which the stack traces can be associated with individual Java threads is by modifying a memory block allocation CVM function call (a "malloc" function) to link the Java thread making the "malloc" memory call to the stack trace that is recorded for that memory allocation. In other words, each time a thread in the CVM Java virtual machine makes a "malloc" memory call, a stack trace is recorded for that memory allocation and the identity of the thread making the "malloc" call is associated with the stack trace. This information is logged and can be analyzed to uniquely identify the memory consumption of individual Java threads. Similarly, a stack trace may be recorded for every memory deallocation, and the identity of the thread deallocating the memory is associated with that stack trace.

In addition, when the memory allocation occurs, the current native memory consumption and virtual machine memory consumption may also be stored along with a memory map, the System Free Memory value, the Process Memory Consumption value (using, for example, the "smemcap" function to capture detailed process memory usage information), JVM heap information, and data obtained using, e.g., the HPROF heap/CPU profiling tool. This can help to identify the stack traces corresponding to memory that has not yet been freed.

Figure 3:
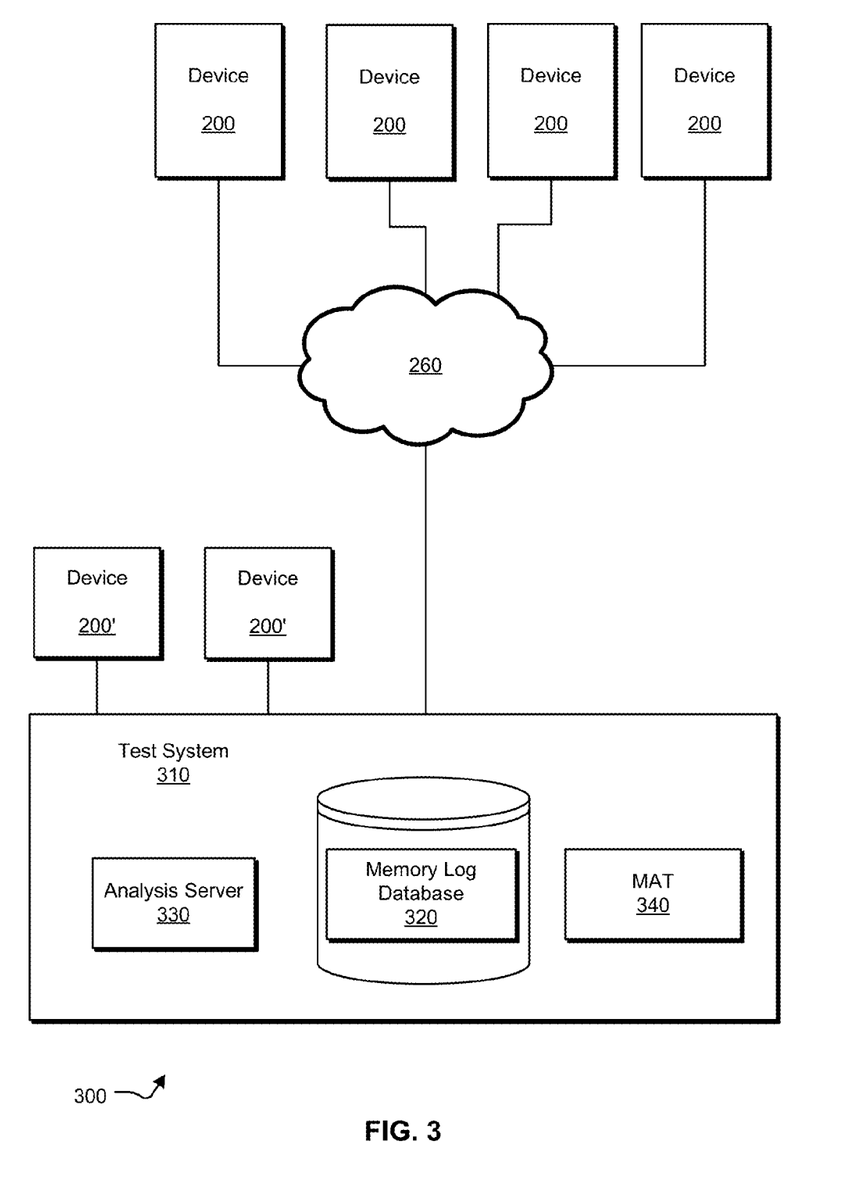
FIG. 3 is a block diagram illustrating an exemplary environment in which embodiments of the present invention may be implemented.

FIG. 3 is a block diagram illustrating an exemplary environment 300 in which embodiments of the present invention may be implemented. A plurality of production computing devices 200 may be in communication with a test system 310 over a wide area network 260. When these devices 200 are operated by the end users, each of these devices 200 will generate memory logs as described above, storing a free memory value and a process memory consumption value on a periodic schedule or in response to certain events. The devices 200 will then send data representing those memory logs to the test system 310 for analysis. This transmission can occur on a predetermined schedule (e.g., once a week, once a month, once a year, etc.) or on demand as instructed by the user of the device 200 or in response to a request from the test system 310. These memory logs may be stored in a memory log database 320 and scripts may be executed by an analysis server 330 on each memory log to extract usage data and to measure memory consumption. The analysis server 330 may analyze the logs to record the memory consumption information for each device 200 and create various memory consumption reports for all of the devices 200, as will be described in greater detail below.

In some embodiments, the test system 310 may request the memory logs from a subset of all of the production devices 200 in use in the field by end users in order to obtain data regarding memory usage by actual end users. This subset may comprise a cross sampling of all of the devices having a certain configuration or including a certain software release being tested, such as, for example 30% of all of the available devices. From this sampling of 30% of the devices, it is expected that the devices will be used in a variety of ways, resulting in a broad distribution of memory consumption scenarios. For test purposes, only a certain percentile of those devices (e.g., the 90th percentile of memory usage, or TP90, or 99th percentile of memory usage, or TP99) is selected for analysis. This data from the TP90 sampling of production devices may be useful for a variety of testing purposes, such as to identify situations in which low memory conditions occur more frequently than average.

For pre-production devices 200', the memory logs of the devices 200' may be retrieved immediately after completion of each test. The memory logs may be stored in a local storage within each device 200' and later uploaded to a server in the test system 310 after the test is completed.

In accordance with some embodiments, a memory acceptance test 340 ("MAT") may be produced to benchmark memory consumption under a variety of use cases for pre-production devices undergoing testing. When performing software testing for new software releases, a plurality of use cases are identified based on the memory logs or based on functional requirements. These use cases are categorized based on decreasing priority or frequency of use as P0, P1, P2, or P3. In some embodiments, the P0 and P1 use cases are selected and used to formulate the test cases to be incorporated into the MAT collection of test templates. New pre-production devices or pre-production software releases are then tested using the MAT test case templates and the memory consumption observed when cycling through the test use cases is stored in a memory log, as described above. The stored memory consumption values for each new software release can then be benchmarked against the memory consumption value thresholds set for previous releases, obtained when applying the MAT tests to those previous releases. Accordingly, the memory consumption values can be used to track memory regressions against each software build, and to enable easy debugging of memory regressions to root cause regressions at the use case level.

Regression tracking can be performed in a variety of ways. For example, the System Free Memory values and Process Memory Consumption values for all test runs can be compiled to produce minimum, maximum, and average values for each. Any value that regresses by a predetermined threshold, e.g., 3-5%, from baseline values or from a previous build, may be identified as a regression.

In some embodiments, multiple levels of MAT templates may be used to test memory consumption under different usage scenarios. For example, three levels of MAT templates may be provided. First, a light use MAT template is generated corresponding to use cases for light users whose expected use of the devices is not expected to consume large amounts of memory. This light use MAT template will include various low impact use cases, such as downloading and reading a small number of short books with little or no graphics. Second, a normal use MAT template may be generated to include the use cases corresponding to the P0 and P1 use cases described above. Third, a heavy use MAT template may be generated corresponding to use cases for heavy users for whom the memory consumption is expected to be very high, such as users who frequently read e-books containing large amounts of graphics. These multiple levels of MAT templates can be used to test regression with a greater level of granularity and specificity for targeting specific types of customers.

In accordance with embodiments of the present invention, a memory analysis application is provided to permit developers and test engineers to review the data retrieved from the memory logs as described above. FIGS. 4A-4G are screen shots of a browser displaying an exemplary memory analysis application.

Figure 4A:
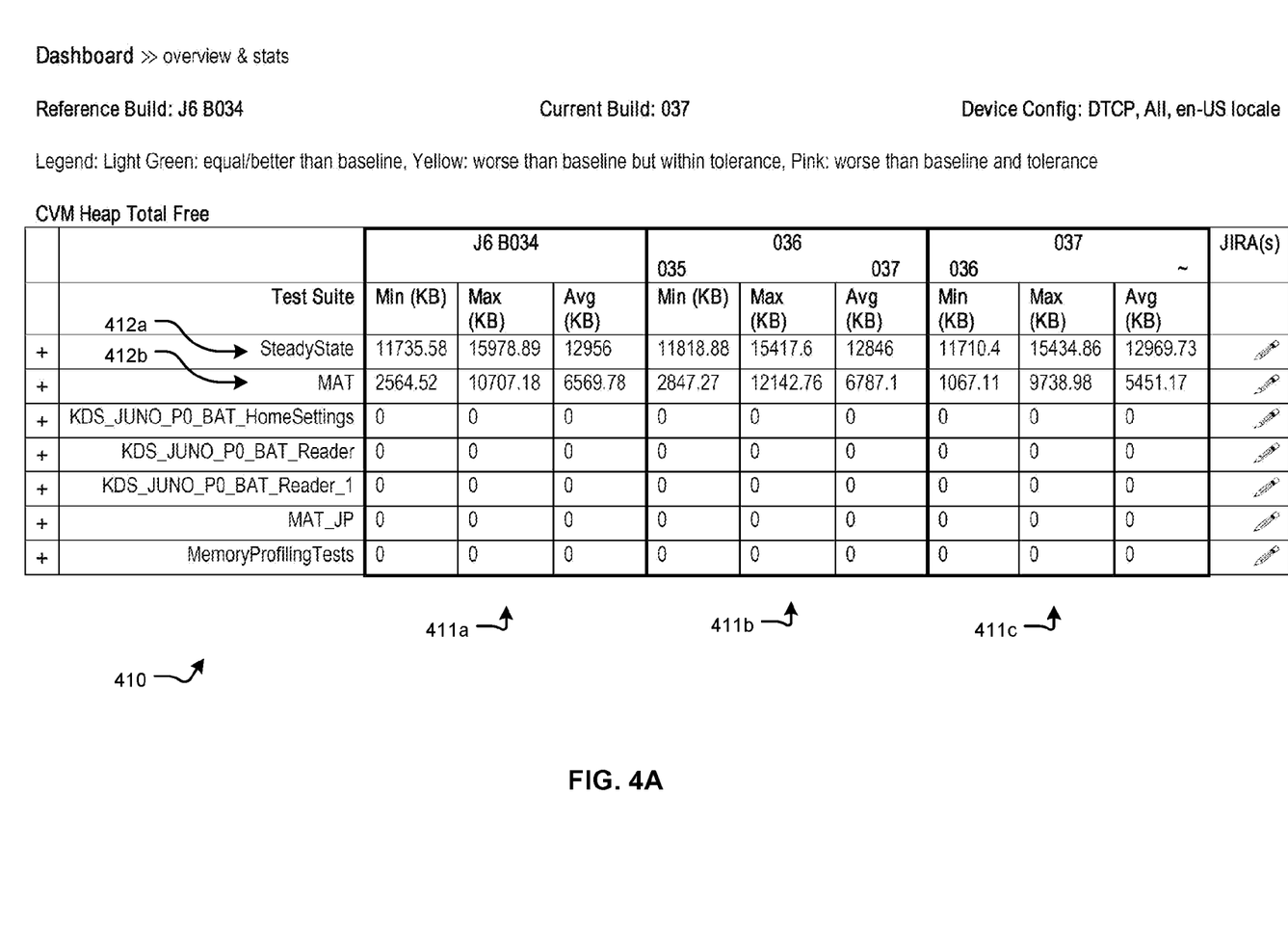

FIG. 4A illustrates a memory leaderboard 410 displaying CVM heap memory comparisons between three different software builds 034, 036, and 037, shown in sections 411a-411c, respectively. Each section 411a-411c shows the minimum, maximum, and average free CVM heap memories in KB for all of the test runs for each build. The first row of data 412a corresponds to the memory logs recorded after the devices are first booted and have reached a steady state condition. The second row of data 412b corresponds to the memory logs recorded after the devices have been run through a MAT template test.

FIG. 4B illustrates a memory leaderboard 420 displaying system free memory and system anonymous page consumption for software builds 034, 036, and 037. As in FIG. 4A, the section for each build shows the minimum, maximum, and average memory parameter values for all of the test runs for that build.

FIG. 4C illustrates a memory leaderboard 430 displaying the process memory consumption for the CVM process for software builds 034, 036, and 037. The user may select one of the buttons 432 to choose whether to display the USS, PSS, RSS, or Anonymous Page Size in the leaderboard 430. In FIG. 4C, the USS button has been selected, so the leaderboard 430 displays the USS values for each of the software builds 034, 036, and 037.

Figure 4D:
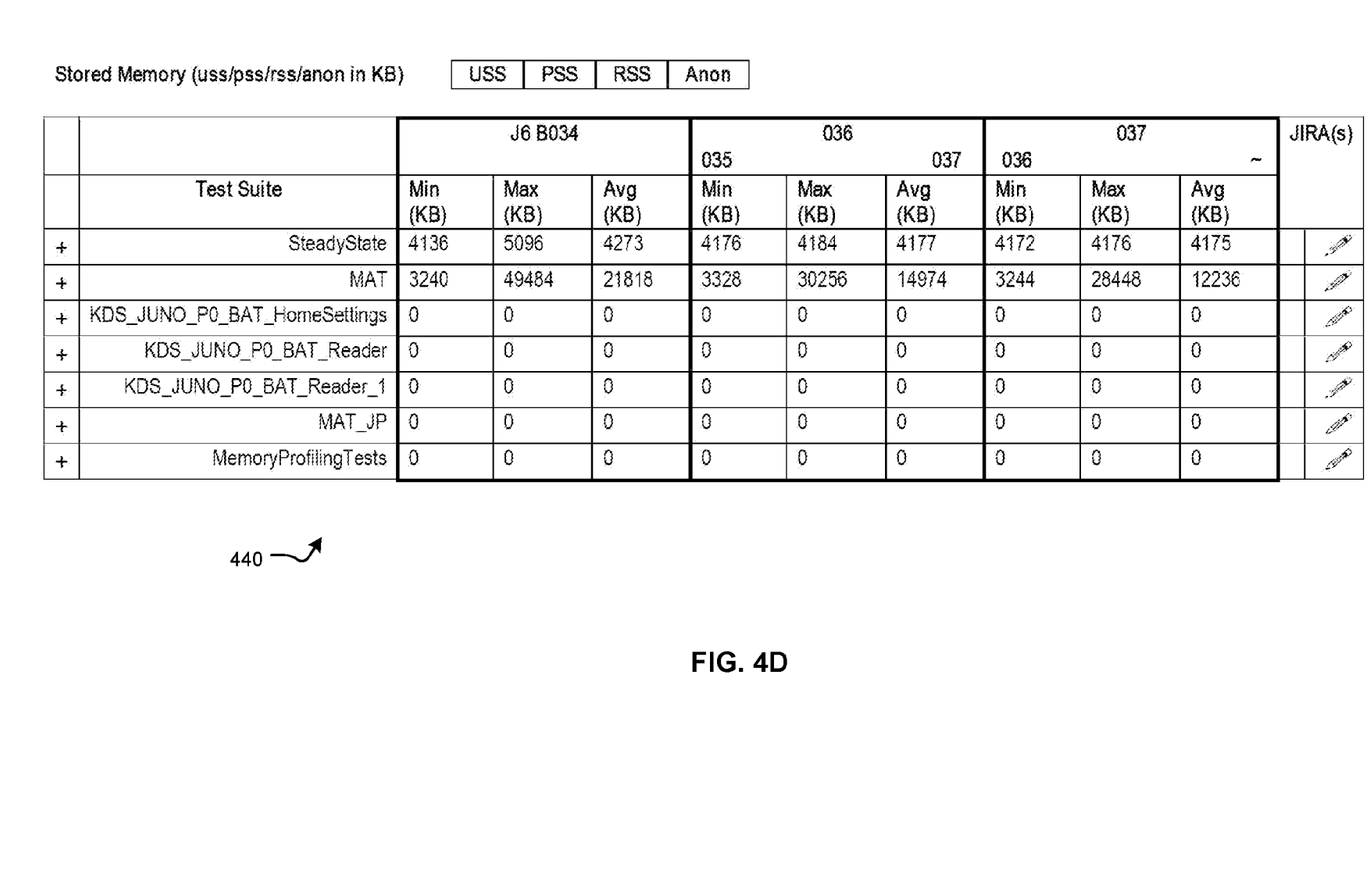

FIG. 4D illustrates a memory leaderboard 440 displaying the process memory consumption for all stored processes in the device.

Figure 4E:
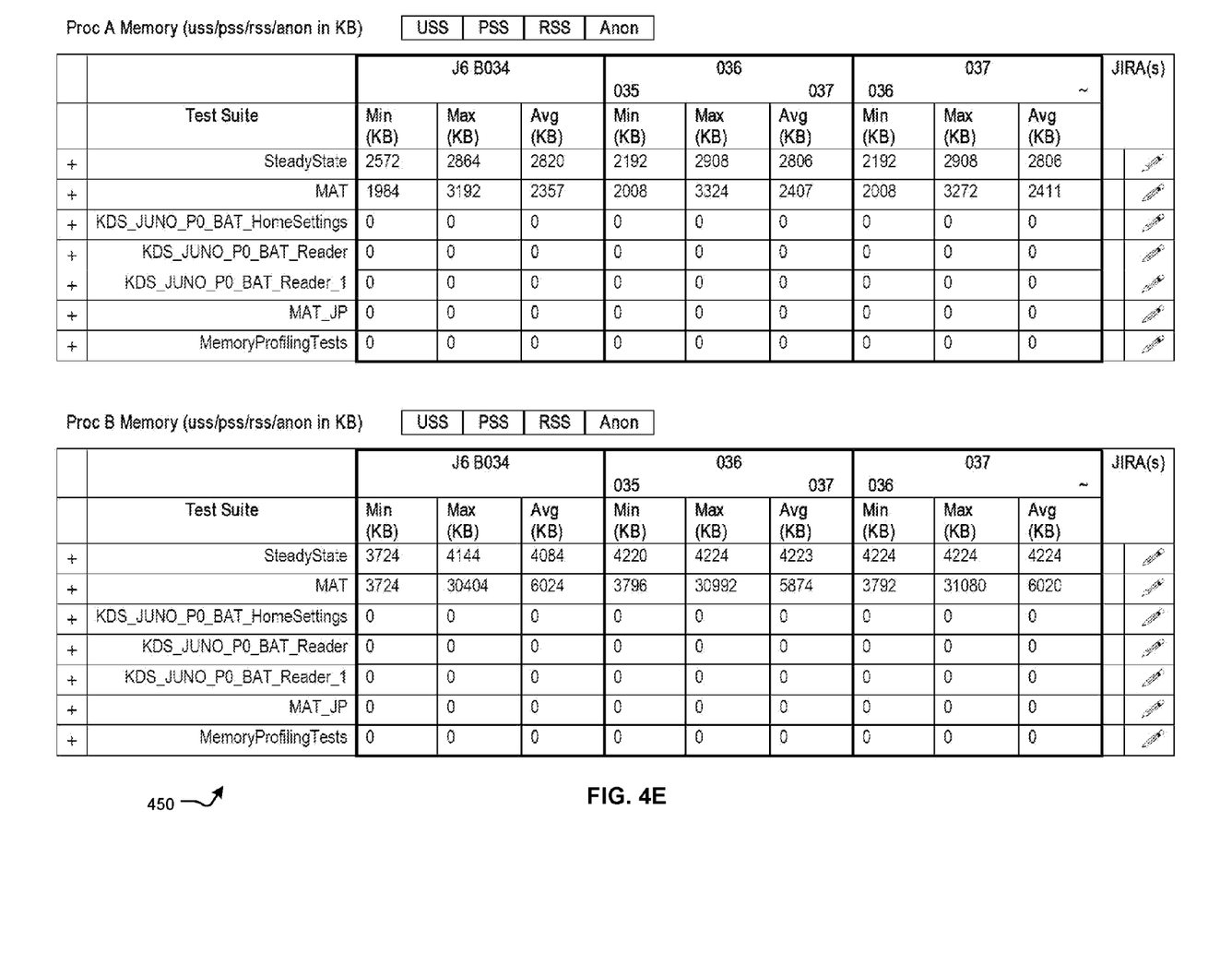

FIG. 4E illustrates a memory leaderboard 450 displaying the process memory consumption for two different processes, Process A and Process B for software builds 034, 036, and 037.

FIG. 4F illustrates a memory leaderboard 460 displaying the process memory consumption for all of the processes running on the device being tested.

Figure 4G:
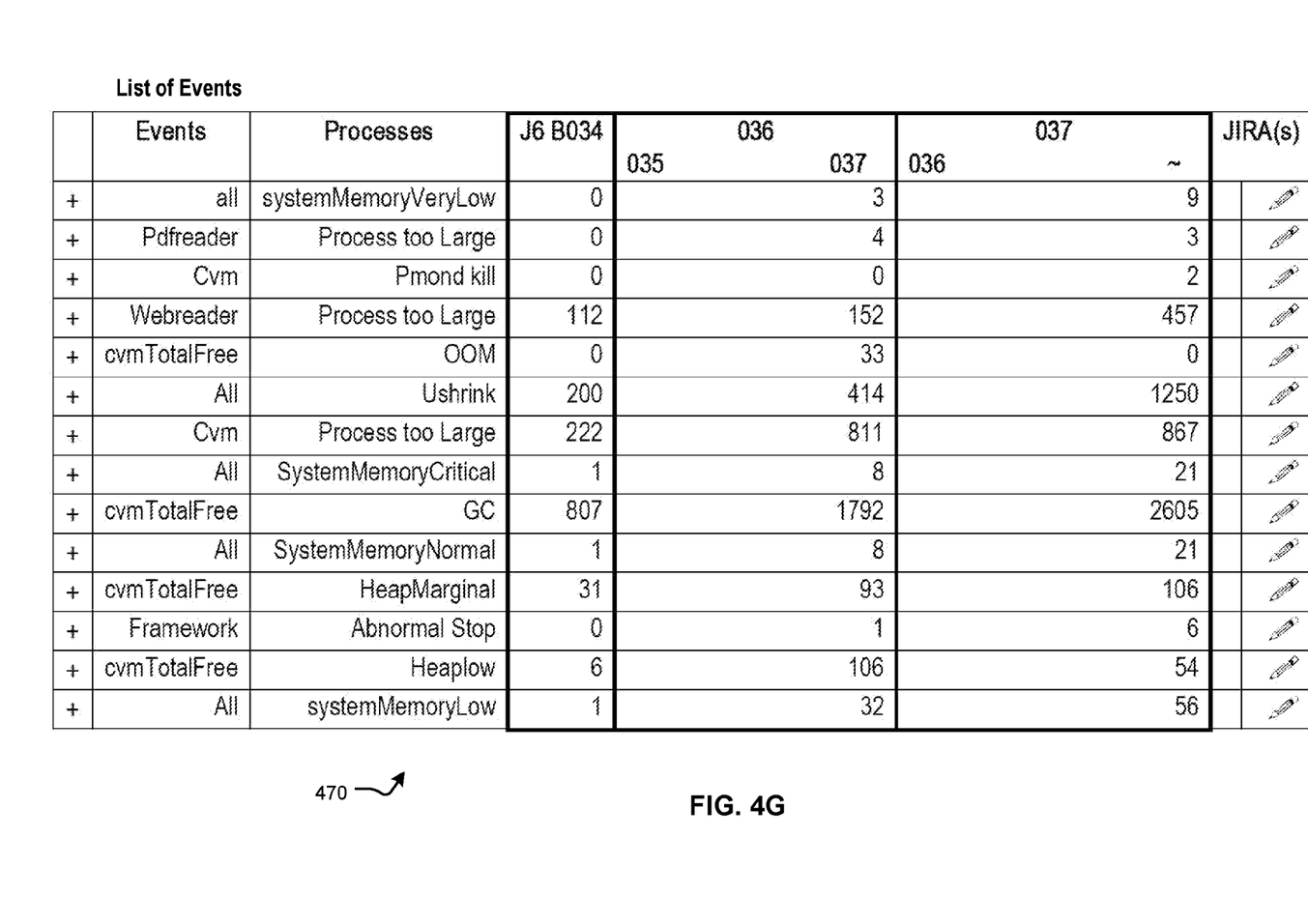

FIG. 4G illustrates a memory leaderboard 470 displaying a list of all of the recorded events that occurred during the execution of the MAT test suite, as well as the count of the number of times each event occurred.

Embodiments of the present invention may provide various advantages not provided by prior art systems. An exemplary advantage of some disclosed embodiments may be that memory consumption may be more precisely measured even when utilizing monolithic processes to perform a variety of functions on a device. In addition, software developers may use the information provided by the memory consumption logs to better understand the memory consumption of their applications under varying test conditions. Moreover, the MAT template may provide a standardized memory test model for approving the addition of new features to software applications prior to commercial release.

While the invention has been described in terms of particular embodiments and illustrative figures, those of ordinary skill in the art will recognize that the invention is not limited to the embodiments or figures described. Many of the embodiments described above are directed at e-reader devices. These systems and methods may be particularly applicable to e-reader devices due to their limited hardware resources and limited functionality. However, other embodiments may be implemented in any type of computing device, such as an e-reader device, a tablet computing device, a smartphone, a media player, a portable gaming device, a portable digital assistant, a laptop computer, a desktop computer, and other mobile and non-mobile computing devices. It should be understood that various types of computing devices including a processing element and a memory can be used in accordance with various embodiments discussed herein.

Although various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and, consequently, are not described in detail herein. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the processes, flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A computer-implemented method of tracking memory usage in an e-reader device comprising a processor, an electrophoretic display, a non-transitory main memory having a total capacity of less than 2 GB, and a non-transitory secondary storage, the method comprising:
   executing a Java virtual machine application for displaying digital media content on the electrophoretic display;
   performing a first memory log operation on the e-reader device on a predetermined schedule; and
   performing a second memory log operation on the e-reader device upon detection of a low memory condition;
   wherein the first memory log operation and the second memory log operation each comprise:
      storing a system free memory value associated with a virtual memory on the device in a memory log on the secondary storage, the system free memory value comprising a sum of free memory plus inactive memory, wherein said free memory comprises an amount of idle memory available in the virtual memory and the inactive memory comprises an amount of memory in the virtual memory allocated to processes that are not currently running; and
      storing a current resident set size for a first running process in the memory log on the secondary storage, the resident set size comprising an amount of memory for the first running process stored in main memory.

2. The method of claim 1, further comprising:
   in response to receiving a request from a remote test server, sending data representing the memory log to the remote test server for analysis with memory logs from a plurality of other e-reader devices to enable generation of an average system free memory for the plurality of other e-reader devices and the e-reader device.

3. The method of claim 1, further comprising:
in response to detecting a low memory condition in which an amount of free memory in the main memory is determined to be below a system-defined amount, storing in the memory log a stack trace list of function calls currently active for each thread executing in the virtual machine.

4. A computer-implemented method of tracking memory usage in a computing device comprising a processor, a non-transitory main memory, and a non-transitory secondary storage, the method comprising:
performing a first memory log operation on a predetermined schedule;
determining an event occurred at the computing device; and
performing a second memory log operation;
wherein performing the first memory log operation and performing the second memory log operation each comprise:
storing a free memory value associated with the device in a memory log on the secondary storage; and
storing a process memory consumption value associated with the device in the memory log on the secondary storage.

5. The method of claim 4, further comprising:
sending data representing the memory log to a management system via a wide area network.

6. The method of claim 4, wherein:
the performing the second memory log operation comprises performing the second memory log operation based on determination of a low memory event occurring at the computing device.

7. The method of claim 4, further comprising:
in response to detection of a memory event, storing a stack trace in the memory log.

8. The method of claim 7, wherein:
the storing the stack trace in the memory log comprises storing the stack trace in the memory log in response to detection of at least one of a memory allocation or a memory deallocation.

9. The method of claim 7, further comprising:
in response to detection of the memory event, storing a native memory consumption and a virtual machine memory consumption.

10. The method of claim 7, further comprising:
in response to detection of the memory event, storing a memory map indicating a current allocation of virtual memory.

11. The method of claim 4, further comprising:
executing a virtual machine with a virtual memory heap;
wherein performing the first memory log operation and performing the second memory log operation each further comprise storing a virtual memory heap availability.

12. The method of claim 4, wherein the computing devices comprises an e-reader device, and further comprising:
executing a virtual machine process for displaying digital content.

13. The method of claim 4, further comprising:
performing a third memory log operation upon boot-up of the computing device.

14. A computing device, comprising:
a non-transitory main memory;
a non-transitory secondary memory configured to store machine-readable instructions;
a display component;
a communications interface;
a processing element communicatively coupled to the main memory, the secondary memory, the display component, and the communications interface, the processing element configured to execute the machine-readable instructions to:
perform a first memory log operation on a predetermined schedule;
determine an event occurred at the computing device; and
perform a second memory log operation;
wherein the first memory log operation and the second memory log operation each cause the computing device to:
store a free memory value associated with the device in a memory log on the secondary storage; and
store a process memory consumption value associated with the device in the memory log on the secondary storage.

15. The computing device of claim 14, wherein the processing element is further configured to execute the machine-readable instructions to:
send data representing the memory log to a management system via a wide area network.

16. The computing device of claim 14, wherein the processing element is further configured to execute the machine-readable instructions to:
perform the second memory log operation by performing the second memory log operation based on determining of a low memory event occurring at the computing device.

17. The computing device of claim 14, wherein:
the free memory value comprises a sum of free memory plus inactive memory.

18. The computing device of claim 14, wherein:
the process memory consumption value comprises one or more of the following: a resident set size, a proportional set size, a unique set size, or an anonymous page size.

19. The computing device of claim 14, wherein:
the first memory log operation and the second memory log operation each further cause the computing device to store a total system level memory.

20. The computing device of claim 14, wherein the processing element is further configured to execute the machine-readable instructions to:
perform the second memory log operation by storing information regarding the determined event in the memory log.

\* \* \* \* \*